Patented Mar. 5, 1935

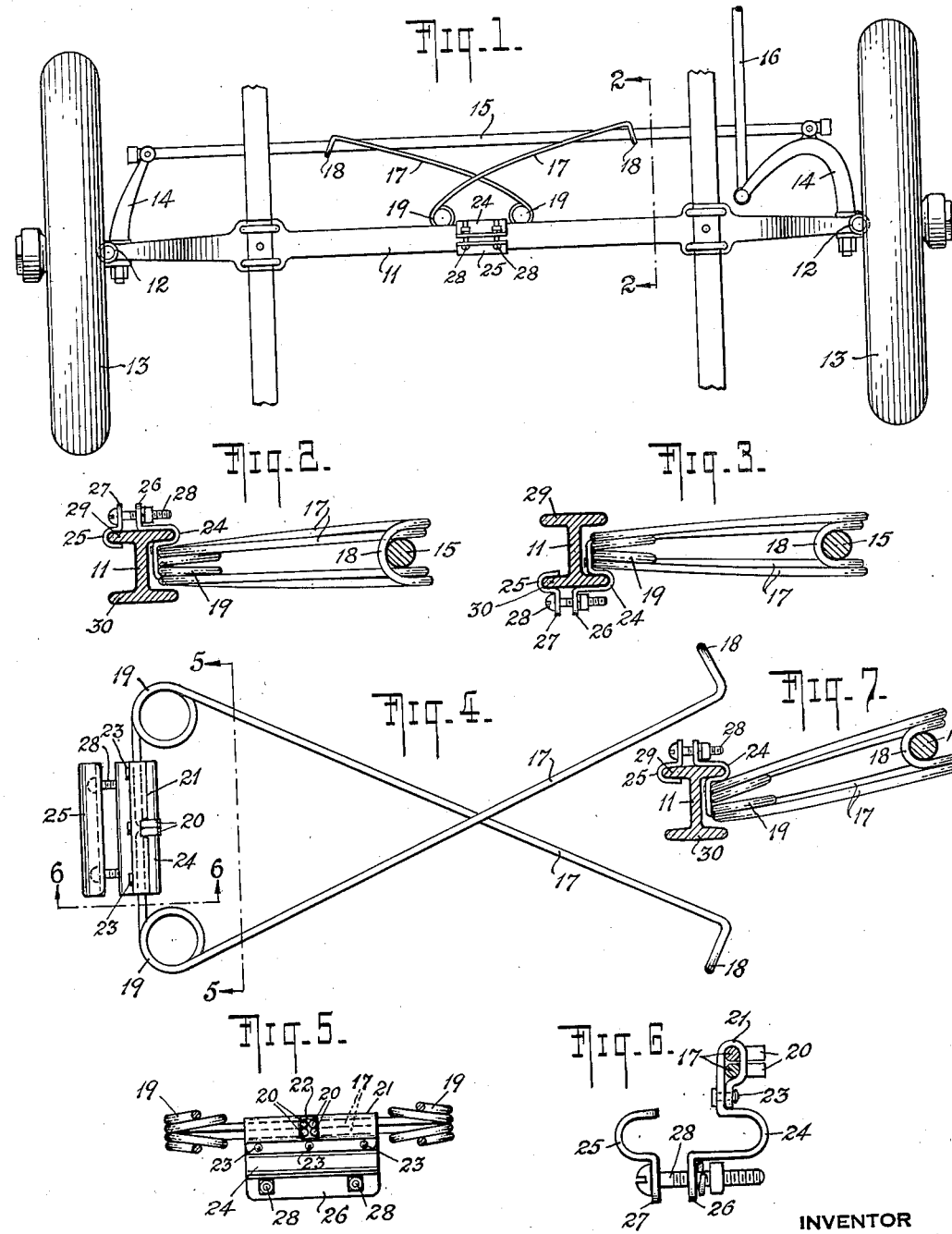

1,993,572

UNITED STATES PATENT OFFICE 1,993,572

STEERING STABILIZER

Louis Stark, Brooklyn, N. Y., assignor to Kastar Specialty Mfg. Co., Inc., New York, N. Y., a corporation of New York Application June 29, 1934, Serial No. 732,972

2 Claims. (Cl. 280—94)

This invention relates to a stabilizer of the type characterized by a plurality of spring arms adapted to be interposed as a unitary structure between an axle of an automotive vehicle and the conventional tie rod connecting the wheel-carrying knuckles of the vehicle, for the purpose of exerting a frictional resistance to relative parallel movements between the tie rod and axle and to prevent shimmying movements of the wheels and other oscillating movements thereof.

An object of the invention is to provide such a stabilizing device which can be readily adapted to a considerable range of existing structures in which the tie rod occupies a position of parallelism to the axle but the exact distance from the axle and the relative position in space varies to an indeterminate extent as between different makes of cars or as between various cars of the same general type.

Another object of the invention is to provide such a stabilizing device with a clamp which can be attached to the axle of the vehicle, with the spring arms adapted to be engaged in an exclusively frictional manner slidingly with the tie rod, in contradistinction to the conventional arrangement in which the stabilizer is clamped to the tie rod, and the free ends of the spring arms are engaged frictionally with the axle.

The conventional arrangement is open to the objection that where the tie rod is not in the exact relative position, with respect to the axle, for which the stabilizer has been designed, there is a tendency of the frictionally contacting ends of the spring arms to bind, and also to be displaced in use, defeating the object of the stabilizer, and/or causing undesirable wear of the contacting parts.

Still another object of the present invention is to provide a stabilizing device which is provided by clamping means for securing the same to the axle either at the top or bottom flange of the I-beam constituting the axle, dependent upon the proximity of the tie rod to one of said flanges.

The above and other features of the invention are illustrated and described fully in the accompanying drawing and specification and are pointed out in the claims.

In the drawing,

Fig. 1 is a plan view of the front part of the chassis of an automotive vehicle, showing the front axle, knuckles, wheels and connecting tie rod, with a stabilizer in the construction of which the invention has been embodied;

Fig. 2 is a detail view in transverse section on the line 2—2 of Fig. 1 showing on a larger scale the manner in which the stabilizer is secured to the axle;

Fig. 3 is a view similar to Fig. 2, but showing the stabilizer secured to the bottom flange of the I-beam axle, the tie rod being in a position more proximate to such bottom flange than to the top flange;

Fig. 4 is a plan view of the steering stabilizer with the spring arms thereof in extended position;

Figs. 5 and 6 are sections on the lines 5—5 and 6—6, respectively, of Fig. 4; and Fig. 7 is a view similar to Fig. 2 but showing the application of the steering stabilizer to a construction of vehicle in which the tie rod is in a position of relationship to the axle different from that of Fig. 2.

In the illustrative embodiment of the invention shown in Fig. 1, the part designated by the reference character 11 is the rigid front axle of an automotive vehicle, being of I-shape in cross-section and provided with knuckles 12 to which the wheels 13 are attached, arms 14 of a more or less conventional type being illustrated, with a tie rod 15 and a connecting rod 16 leading to the steering wheel in usual fashion.

The tie rod 15 occupies a position of general parallelism relatively to the axle 11, and may vary in its exact spacial relationship to a considerable extent from the position shown in Figs. 2 and 3, for instance, to the extent shown in Fig. 7, i. e., it may be higher or lower than, or nearer to or farther from, the axle without interfering with the desirable efficiency of the improved stabilizer forming the subject-matter of the present application.

In pursuance of the invention, the stabilizer is fabricated as a unitary structure comprising a pair of spring members 17 each formed of a single piece of wire bent medially to form a yoke 18 of suitable shape to partially surround the tie rod 15 and be engaged exclusively frictionally therewith, the shanks 18 of each of the wire strings being formed in auxiliary spring coils, as at 19, at a region near the axle, the free ends 20 of the shanks being fixedly secured within a clamp 21 common to the spring members and having an aperture 22 through which extend the free ends 20 of the shanks. One edge of the clamp 21 is secured to the clamp body, as by rivets 23. The remaining portion of the clamp body constitutes plates 24 and 25 having flanges 26 and 27 and bolts 28, by which it may be secured firmly to either one of the flanges 29 and 30 of the I-beam axle 11, depending upon the spacing of the tie rod 15, so that provision is thus made for ready adjustment to an axle in such a manner as to cause presentation of the spring-contact-yokes 18 in proper position to be engaged firmly with the tie rod 15 without danger of casual displacement therefrom in use.

From the foregoing, it will be readily understood that the stabilizer embodies the advantages of operation characteristic of this general type of anti-shimmy stabilizer, without being subject to the disadvantages of operation and failure to which reference has been made above; and it constitutes a unitary structure of an inexpensive, sturdy character which can be sold as a separate accessory to, and easily applied by, the individual user of a car as well as embodied in standard equipment of a wide variety of automotive vehicles having the general arrangement of axle and tie rod herein illustrated.

I claim:

1. In an automotive vehicle, the combination with an I-beam axle provided at its ends with steering knuckles connected by a tie rod spaced from said axle, of a stabilizer device fixedly mounted on said axle, in a position spaced from each knuckle, said device comprising a spring member having free spring arms with which said rod is in exclusively frictional sliding engagement, said spring arms each including a piece of wire bent intermediate its ends to form a yoke contact-portion partially surrounding said tie rod and having its other ends respectively confined within a clamp common to said ends and secured removably to said axle, the ends of said shanks being confined in juxtaposition to each other within said clamp, and having their middle portions respectively formed with a substantially horizontal coil extending laterally from said clamp and then bent back in X fashion relatively to each other for engagement of the yokes with said rod, said clamp being attachable selectively to either flange of said I-beam.

2. As an article of manufacture, a stabilizer device for automotive vehicles of the type having an I-beam axle provided at its ends with steering knuckles connected by a tie rod spaced from said axle; said device comprising a clamp attachable to said I-beam in selected positions relatively to the flanges thereof and at a region spaced from each knuckle, a spring member having free spring arms, each including a piece of wire bent intermediate its ends to form a yoke contact-portion adapted to surround said tie rod partially, the ends of the spring arms being confined in juxtaposition to each other within said clamp, said shanks being respectively formed with a substantially horizontal coil extending laterally from said clamp and the middle portions of the shanks being bent back in X fashion relatively to each other for exclusively frictional sliding engagement of the yokes with said tie rod.

LOUIS STARK.